(12) United States Patent
Nakashima et al.

(10) Patent No.: US 9,711,822 B2
(45) Date of Patent: Jul. 18, 2017

(54) LITHIUM-LANTHANUM-TITANIUM OXIDE SINTERED MATERIAL, SOLID ELECTROLYTE CONTAINING THE OXIDE, AND LITHIUM AIR BATTERY AND ALL-SOLID LITHIUM BATTERY INCLUDING THE SOLID ELECTROLYTE

(71) Applicants: TOHO TITANIUM CO., LTD., Chigasaki-shi, Kanagawa (JP); NAKASHIMA SANGYO CO., LTD., Aichi (JP); THE GAKUSHUIN SCHOOL CORPORATION, Tokyo (JP)

(72) Inventors: Mamoru Nakashima, Yokohama (JP); Yoshiyuki Inaguma, Tokyo (JP); Mikio Nakashima, Owariasahi (JP)

(73) Assignees: TOHO TITANIUM CO., LTD., Kanagawa (JP); NAKASHIMA SANGYO CO., LTD., Seto-Shi, Aichi (JP); THE GAKUSHUIN SCHOOL CORPORATION, Tokyo (JP)

( * ) Notice: Subject to any disclaimer, the term of this patent is extended or adjusted under 35 U.S.C. 154(b) by 0 days.

(21) Appl. No.: 14/396,955

(22) PCT Filed: Apr. 22, 2013

(86) PCT No.: PCT/JP2013/061795
§ 371 (c)(1),
(2) Date: Oct. 24, 2014

(87) PCT Pub. No.: WO2013/161765
PCT Pub. Date: Oct. 31, 2013

(65) Prior Publication Data
US 2015/0099197 A1 Apr. 9, 2015

(30) Foreign Application Priority Data

Apr. 25, 2012 (JP) .................................. 2012-099456
Jul. 27, 2012 (JP) .................................. 2012-167432

(51) Int. Cl.
*H01M 10/0561* (2010.01)
*H01M 10/0562* (2010.01)
(Continued)

(52) U.S. Cl.
CPC ...... *H01M 10/0562* (2013.01); *C01G 23/005* (2013.01); *C01G 23/006* (2013.01);
(Continued)

(58) Field of Classification Search
None
See application file for complete search history.

(56) References Cited

U.S. PATENT DOCUMENTS 4,405,480 A * 9/1983 Murase ............... H01G 4/1281
252/520.21
6,022,642 A * 2/2000 Tsukamoto et al. .......... 429/312
(Continued)

FOREIGN PATENT DOCUMENTS

EP 2093824 A1 8/2009
JP 06-333577 12/1994
(Continued)

OTHER PUBLICATIONS

EN translation of JP2008-112661A 2008.*
(Continued)

*Primary Examiner* — Lucas J. O'Donnell
(74) *Attorney, Agent, or Firm* — Fitch, Even, Tabin & Flannery, LLP

(57) ABSTRACT

A lithium-lanthanum-titanium oxide sintered material has a lithium ion conductivity $3.0 \times 10^{-4}$ $Scm^{-1}$ or more at a mea-
(Continued)

suring temperature of 27° C., the material is described by one of general formulas $(1-a)La_xLi_{2-3x}TiO_3\text{-}aSrTiO_3$, $(1-a)La_xLi_{2-3x}TiO_3\text{-}aLa_{0.5}K_{0.5}TiO_3$, $La_xLi_{2-3x}Ti_{1-a}M_aO_{3-a}$, $Sr_{x-1.5a}La_aLi_{1.5-2x}Ti_{0.5}Ta_{0.5}O_3$ ($0.55 \leq x \leq 0.59$, $0 \leq a \leq 0.2$, M=at least one of Fe or Ga), amount of Al contained is 0.35 mass % or less as $Al_2O_3$, amount of Si contained is 0.1 mass % or less as $SiO_2$, and average particle diameter is 18 μm or more.

5 Claims, 2 Drawing Sheets

(51) Int. Cl.
| | |
|---|---|
| *H01M 12/08* | (2006.01) |
| *C04B 35/462* | (2006.01) |
| *C04B 35/47* | (2006.01) |
| *C04B 35/64* | (2006.01) |
| *H01M 10/0525* | (2010.01) |
| *C04B 35/495* | (2006.01) |
| *C01G 23/00* | (2006.01) |
| *C01G 35/00* | (2006.01) |
| *C01G 49/00* | (2006.01) |
| *H01B 1/06* | (2006.01) |

(52) U.S. Cl.
 CPC ....... *C01G 35/006* (2013.01); *C01G 49/0054* (2013.01); *C04B 35/462* (2013.01); *C04B 35/47* (2013.01); *C04B 35/495* (2013.01); *C04B 35/64* (2013.01); *H01M 10/0525* (2013.01); *H01M 12/08* (2013.01); *C01P 2002/50* (2013.01); *C01P 2004/61* (2013.01); *C01P 2006/40* (2013.01); *C04B 2235/3201* (2013.01); *C04B 2235/3203* (2013.01); *C04B 2235/3213* (2013.01); *C04B 2235/3217* (2013.01); *C04B 2235/3227* (2013.01); *C04B 2235/3236* (2013.01); *C04B 2235/3255* (2013.01); *C04B 2235/3272* (2013.01); *C04B 2235/3286* (2013.01); *C04B 2235/3418* (2013.01); *C04B 2235/5436* (2013.01); *C04B 2235/661* (2013.01); *C04B 2235/786* (2013.01); *C04B 2235/80* (2013.01); *C04B 2235/81* (2013.01); *H01B 1/06* (2013.01); *H01M 2300/0071* (2013.01); *Y02E 60/128* (2013.01); *Y02T 10/7011* (2013.01)

(56) References Cited

U.S. PATENT DOCUMENTS

| | | | |
|---|---|---|---|
| 2008/0220334 A1 | 9/2008 | Inda | |
| 2011/0318650 A1* | 12/2011 | Zhang | H01M 10/0562 429/320 |

FOREIGN PATENT DOCUMENTS

| | | |
|---|---|---|
| JP | 7-169456 A | 7/1995 |
| JP | 2008-112661 A | 5/2008 |
| JP | 2010-262876 A | 11/2010 |
| JP | 2011-134628 A | 7/2011 |
| JP | 2011-222415 A | 11/2011 |

OTHER PUBLICATIONS

EN Translation of JP07-169456A 1995.*
"Synthesis of Fine Powders of Li3xLa2/3—xTiO3 Perovskite by a Polymerizable Precursor Method"; Murugesan Vijayakumar,†, Yoshiyuki Inaguma, ‡,§, Wataru Mashiko, ‡ fsi, Marie-Pierre Crosnier-Lopez,† and Claude Bohnke*,† Chemistry of Materials 2004 16 (14), 2719-2724; DOI: 10.1021/cm049869x.*
Stramare et al., Lithium Lanthanum Titanates: A Review, Chem. Mater. 2003, 15, 3974-3990.*
Mei et al., Enhanced ionic transport in lithium lanthanum titanium oxide solid state electrolyte by introducing silica, Solid State IOnics, 179 39, 2255-59, 2008.*
Yashima et al., Crystal Structure and Diffusion Path in the Fast Lithium-Ion Conductor $La_{0.62}Li_{0.16}TiO_3$, J. Am. Chem. Soc., vol. 127, No. 10, Mar. 16, 2005, pp. 3491-3495.
Inaguma et al., Synthesis and Lithium Ion Conductivity of Cubic Deficient Perovskites $Sr_{0.5+x}Li_{0.5-2x}\square^{Ti}_{0.5}Ta_{0.5}O_3$ and the La—Doped Compounds, Solid State Ionics, vol. 174, 2004, pp. 19-26.
Vijayakumar et al., Synethesis of Fine Powders of $Li_{3x}La_{2/3-x}TiO_3$ Perovskite by a Polymerizable Precursor Method, Chem. Mater, vol. 16, 2004, p. 2719-2724.
Varez et al., Structural Modifications Induced by High-Temperature Quenching Treatments in the Fast Ion Conductor $Li_{0.18}La_{0.61}TiO_3$: A Neutron Diffraction Study, Chem. Mater, vol. 15, 2003, p. 4637-4641.
Katsumata et al., Anomaly of Temperature Dependence of Dielectric Permittivity for Perovskite-type Oxides, $La_{0.53}Na_{0.41-x}Li_xTiO_3$, vol. 154-155, 2002, pp. 795-799.
Katsumata et al., Influence of Covalent Character on High Li Ion Conductivity in a Perovskite-Type Li Ion Conductor: Prediction from a Molecular Dynamics Simulation of $La_{0.6}Li_{0.2}TiO_3$, vol. 14, 2002, p. 3930-3936.
Inaguma et al., Crystal Structure of a Lithium Ion-Conducting Perovskite La $_{2/3-x}Li_{3x}TiO_3$ (x=0.05), J. Solid State Chemistry, vol. 166, 2002, p. 67-72.
Kunugi et al., Investigation of Isotope Effect of Lithium Ion Conductivity in (La, Li) $TiO_3$ Single Crystal, Electrochemical and Solid-State Letters, vol. 5, No. 6, 2002, p. A131-A134.
Katsumata et al., Molecular Dynamics Simulation of the High Lithium Ion Conductor, $La_{0.6} Li_{0.2}TiO_3$, Journal of Ceramic Society of Japan, vol. 107, 1999, p. 615-621.
Kunugi et al., Electrochemical Recovery and Isotope Separation of Lithium Ion Employing Lithium Ion Conductive Perovskite-type Oxides, Solid State Ionics 122, 1999, p. 35-39.
Inaguma et al., Lithium Ion Conductivity in a Perovskite Lanthanum Lithium Titanate Single Crystal, Journal of Ceramic Society of Japan, vol. 105, No. 6, Feb. 17, 1997, p. 548-550.
Inaguma et al., Influences of Carrier Concentration and Site Percolation on Lithium Ion Conductivity in Perovskite-type Oxides, Solid State Ionics, 1996, p. 257-260.
Katsumata et al., Influence of Site Percolation and Local Distortion on Lithium Ion Conductivity in Perovskite-type Oxides $La_{0.55}Li_{0.35-x} K_xTiO_3$ and $La_{0.55}Li_{0.35}TiO_3$—$KMO_3$ (M=Nb and Ta), Solid State Ionics, vol. 86-88, 1996, p. 165-169.
Shan et al., Oxide Cathode with Perovskite Structure for Rechargeable Lithium Secondary Batteries, Journal of Power Sources, 1995, vol. 54, p. 397-402.
Inaguma et al.,The Effect of the Hydrostatic Pressure on the Ionic Conductivity in a Perovskite Lanthanum Lithium Titanate, J. Electrochem Soc. vol. 142, No. 1, Jan. 1995, p. L8-L11.
Oguni et al., Calorimetric and Electrical Studies on the Positional Disorder of Lithium Ions in Lithium Lanthanum Titanate, Solid State Communications, vol. 91, No. 8, 1994, p. 627-630.
Itoh et al., High Lithium Ion Conductivity in the Perovskite-type Compounds $Ln_{1/2} Li_{1/2}TiO_3$ (Ln=La,Pr, Nd, Sm), Solid State Ionics vol. 70-71, 1994, p. 203-207.
Inaguma et al.,Candidate Compounds with Perovskite Structure for High Lithium Ionic Conductivity, Solid State Ionics, Vo. 70-71, 1994, p. 196-202.
Yoshiyuki Inaguma et al., A rechargeable lithium-air battery using a lithium ion-conducting lanthanum lithium titanate ceramics as an electrolyte separaor, Journal of Power Sources 228 (2013) 250-255.
Takashi Uchida et al., High Ionic Conductivity in Lithium Lanthanum Titanate, Solid State Communications, 1993, pp. 689-693, vol. 86, No. 10.
Geng et al., Effect of Sintering Temperature on Microstructure and Transport Properties of Li3xLa2/3—xTiO3 with different Lithium Contents, Electrochimica Acta, vol. 56, No. 9, Jun. 2011, p. 3406-3414.

(56) References Cited

OTHER PUBLICATIONS

Yang et al., Role of Lithium Ions and La/Li-site Vacancies in Sinterability and Total Ionic Conduction Properties of Polycrystalline Li3x La2/3—x TiO3 Solid Electrolytes (0.21 < 3x < 0.50), Journal of Alloys and Compounds, vol. 458, Nos. 1-2, Jun. 2008, p. 415-424.

Wang et al., A lithium-Air Battery with a Potential to Continuously Reduce O2 from Air for Delivering Energy, Journal of Power Sources, vol. 195, No. 1, Jan. 2010, pp. 358-361.

EP Search Report of Appln. No. 13780889.5 dated Dec. 2, 2015 in English.

Thangadurai et al., LiSr1.65□ 0.35B1.3B'1.7O9 (B=Ti, Zr; B'—Nb, Ta): New Lithium Ion Conductors Based on the Perovskite Structure, Chem. Mater 1999, 11, Solid State and Structural Chemistry Unit, Indian Institute of Science, pp. 835-839.

Office Action of CN Appln. No. 201380021848.6 dated Jul. 23, 2015 in English.

\* cited by examiner

LITHIUM-LANTHANUM-TITANIUM OXIDE SINTERED MATERIAL, SOLID ELECTROLYTE CONTAINING THE OXIDE, AND LITHIUM AIR BATTERY AND ALL-SOLID LITHIUM BATTERY INCLUDING THE SOLID ELECTROLYTE

TECHNICAL FIELD

The present invention relates to lithium-lanthanum-titanium oxide sintered material that can be used as a solid electrolyte for a lithium primary battery and a lithium secondary battery, for example, a solid electrolyte for an all-solid lithium ion battery and a solid electrolyte for a lithium air battery.

BACKGROUND ART

Recently, accompanied by rapid spreading of information devices and communication devices, such as personal computers, video cameras and cell phones, development of batteries for power supply thereof has become more important. Furthermore, also in the field of vehicles, development of batteries having high output and high capacity for electric cars and hybrid cars has been promoted. Among several kinds of batteries used therefor, attention is focused on lithium ion secondary batteries because they have high energy density and output. A typical lithium ion secondary battery is formed by a cathode active material layer, an anode active material layer, and an electrolyte between the cathode and anode active material layers.

On the other hand, attention is also focused on air batteries as a secondary battery having high capacity. Japanese Unexamined Patent Application Publication No. 2011-134628 discloses a lithium air battery in which water-soluble electrolytic solution is used at the air electrode side. This lithium air battery consists of an anode, an organic electrolytic solution for the anode, a separator of solid electrolyte, a water-soluble electrolytic solution for an air electrode, and the air electrode, in this order. A material that does not allow penetration of a water component, dissolved gas, protons ($H^+$), hydroxide ions ($OH^-$) or the like, is provided as the solid electrolyte.

Furthermore, the all-solid lithium ion battery is a lithium ion battery in which a solid electrolyte is used as the electrolyte. The all-solid lithium ion battery is a focus of attention as an alternative to commercially available lithium ion secondary batteries in which an organic electrolytic solution is used as the electrolyte, since it has no risk of electrolytic solution leakage and gas generation.

A material having high lithium ion conductivity is necessary as the solid electrolyte for the air battery and the all-solid lithium ion battery. As such material having high lithium ion conductivity, lithium-lanthanum-titanium oxides are the focus of attention (See Japanese Unexamined Patent Application Publications Nos. 2010-262876 and 2011-222415).

The document "Y. Inaguma, et al., Solid State Communications 689-693 (1993) 86." discloses that lithium-lanthanum-titanium oxide exhibits high lithium ion conductivity of $7 \times 10^{-5}$ $Scm^{-1}$. Furthermore, the document "A. Mei, et al., Solid State Ionics 2255-2259 (2008) 179." discloses that lithium ion conductivity is improved up to $8.9 \times 10^{-5}$ $Scm^{-1}$ ($SiO_2$ concentration 2.31 mass %, a measuring temperature of 30° C.) by adding Si to lithium-lanthanum-titanium oxide so that the concentration of $SiO_2$ is 0.58 to 2.89 mass %. Furthermore, US Unexamined Patent Application Publication No. 20110318650 discloses that lithium ion conductivity is improved to $9.33 \times 10^{-4}$ $Scm^{-1}$ at the inside of a particle and $2.38 \times 10^{-5}$ $Scm^{-1}$ at an interface between particles (a measuring temperature of 30° C.) by adding $Al_2O_3$ to lithium-lanthanum-titanium oxide so that the concentration of $Al_2O_3$ is 11.1 mass %.

From the viewpoint of increasing output of a battery, a solid electrolyte material having high lithium ion conductivity is required. An object of the present invention is to provide a lithium-lanthanum-titanium oxide sintered material having lithium ion conductivity of $3.0 \times 10^{-4}$ $Scm^{-1}$ or more at a measuring temperature of 27° C. as the solid electrolyte material.

SUMMARY OF THE INVENTION

As a result of research by the inventors, they finally succeeded in obtaining lithium-lanthanum-titanium oxide sintered material having a lithium ion conductivity $3.0 \times 10^{-4}$ $Scm^{-1}$ or more at a measuring temperature of 27° C., by reducing $Al_2O_3$ and $SiO_2$, which are inevitable impurities during the process for production, to less than a certain amount.

That is, the lithium-lanthanum-titanium oxide sintered material of the present invention is described by one of the general formulas $(1-a)La_xLi_{2-3x}TiO_3\text{-}aSrTiO_3$, $(1-a)La_xLi_{2-3x}TiO_3\text{-}aLa_{0.5}K_{0.5}TiO_3$, $La_xLi_{2-3x}Ti_{1-a}M_aO_{3-a}$, $Sr_{x-1.5a}La_aLi_{1.5-2x}Ti_{0.5}Ta_{0.5}O_3$ ($0.55 \leq x \leq 0.59$, $0 \leq a \leq 0.2$, M=at least one of Fe or Ga), amount of Al contained is 0.35 mass % or less as $Al_2O_3$, amount of Si contained is 0.1 mass % or less as $SiO_2$, and average particle diameter is 18 μm or more. It should be noted that the average particle diameter herein does not mean the particle diameter of raw material powder; rather, it means the size of the crystal particle of each section that is defined by a particle interface, in the sintered material. According to the present invention, the lithium-lanthanum-titanium oxide sintered material having a lithium ion conductivity $3.0 \times 10^{-4}$ $Scm^{-1}$ or more can be obtained, and the lithium-lanthanum-titanium oxide sintered material can be used as a raw material of the solid electrolyte. Therefore, it can be used as the solid electrolyte of lithium air battery and the all-solid lithium battery.

Furthermore, the solid electrolyte of the present invention contains the lithium-lanthanum-titanium oxide sintered material.

Furthermore, the lithium air battery of the present invention contains the lithium-lanthanum-titanium oxide sintered material as the solid electrolyte.

Furthermore, the all-solid lithium ion battery of the present invention contains the lithium-lanthanum-titanium oxide sintered material as the solid electrolyte.

According to the present invention, lithium-lanthanum-titanium oxide sintered material having a lithium ion conductivity of $3.0 \times 10^{-4}$ $Scm^{-1}$ or more that is appropriate for the solid electrolyte material for air battery and all-solid lithium ion battery, can be obtained.

MODE FOR CARRYING OUT THE INVENTION

Figure 1:
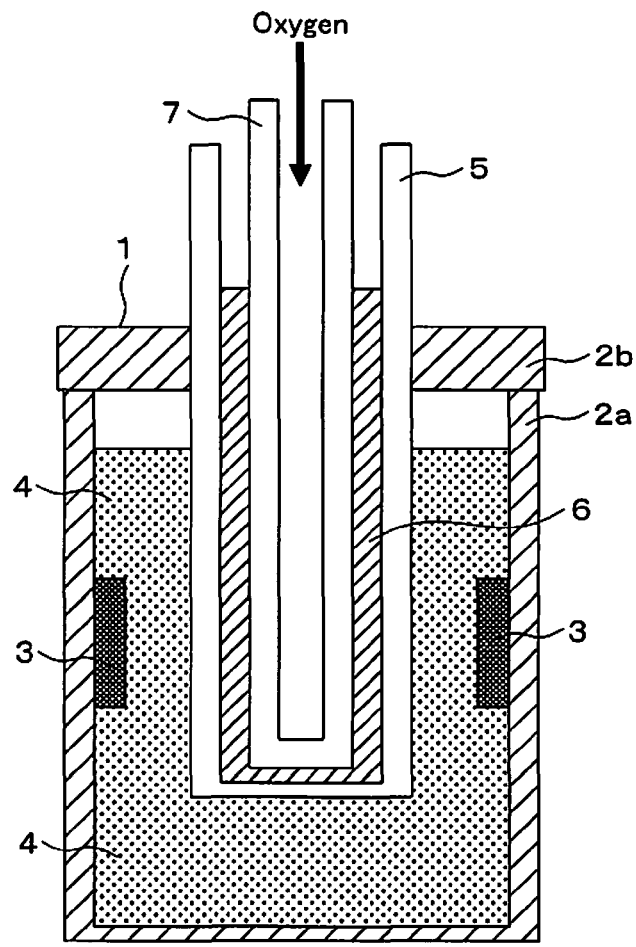
FIG. 1 is a conceptual drawing showing an air battery used in an Example of the present invention.

The lithium-lanthanum-titanium oxide sintered material of the present invention is a solid electrolyte material that is described by one of general formulas $(1-a)La_xLi_{2-3x}TiO_3\text{-}aSrTiO_3$, $(1-a)La_xLi_{2-3x}TiO_3\text{-}aLa_{0.5}K_{0.5}TiO_3$, $La_xLi_{2-3x}Ti_{1-a}M_aO_{3-a}$, $Sr_{x-1.5a}La_aLi_{1.5-2x}Ti_{0.5}Ta_{0.5}O_3$ ($0.55 \le x \le 0.59$, $0 \le a \le 0.2$, M=at least one of Fe or Ga), and in which amount of $Al_2O_3$ contained is 0.35 mass % or less, the amount of $SiO_2$ contained is 0.1 mass % or less, and the average particle diameter is 18 μm or more. By setting in the above range, the lithium-lanthanum-titanium oxide sintered material having lithium ion conductivity of $3.0 \times 10^{-4}$ $Scm^{-1}$ or more at a measuring temperature of 27° C. can be obtained.

Desirably, the lithium-lanthanum-titanium oxide sintered material has $x=0.57$, $a \le 0.05$ in the above composition formula. By setting in the range, the lithium-lanthanum-titanium oxide sintered material having lithium ion conductivity $4.0 \times 10^{-4}$ $Scm^{-1}$ or more at a measuring temperature of 27° C. can be obtained.

More desirably, the lithium-lanthanum-titanium oxide sintered material has $x=0.57$, $a=0$ in the above composition formula, and the average particle diameter is 21 μm or more. By setting this in this range, the lithium-lanthanum-titanium oxide sintered material having lithium ion conductivity of $5.0 \times 10^{-4}$ $Scm^{-1}$ or more at a measuring temperature of 27° C. can be obtained.

$Al_2O_3$ concentration and $SiO_2$ concentration of the lithium-lanthanum-titanium oxide sintered material of the present invention are measured by a wavelength-dispersive fluorescent X-ray spectrometer.

The composition (x, a) of the lithium-lanthanum-titanium oxide sintered material of the present invention is determined by the following method. The lithium-lanthanum-titanium oxide, $Na_2O_2$ and NaOH are placed in a zirconium crucible, and then they are heated and melted. After that, it is left to cool and is dissolved by adding water and HCl. The liquid part that dissolved is collected, and quantitative determination is performed by an aluminum reduction—ammonium iron sulfate (III) titration method for Ti, and by an ICP emission spectroscopy for the other elements.

Lithium ion conductivity of lithium-lanthanum-titanium oxide sintered material of the present invention is measured as follows. A surface of a sample of lithium-lanthanum-titanium oxide sintered material in tabular shape (15 mm×15 mm×2.5 mm) is polished by a diamond grinding stone of #150 and is finished by diamond grinding stone of #600. 1M lithium chloride water solution is absorbed in two sheets of filtering paper that are cut in a size of 10 mm×10 mm, and the tabular lithium-lanthanum-titanium oxide is adhered between the sheets. A Cole-Cole plot was measured by using an impedance analyzer in measuring frequency 5 to 13 MHz and a measuring temperature of 27° C., and resistance value inside of the particle and at a particle interface is read based on the data measured. Lithium ion conductivity is calculated by the following formula.

$$\text{Lithium ion conductivity } (Scm^{-1}) = 1/(R_b + R_{gb}) \times (L/S)$$

$R_b$: resistance inside of particle (Ω)
$R_{gb}$: resistance at interface of particle (Ω)
L: thickness of tabular lithium-lanthanum-titanium oxide (cm)
S: area of electrode ($cm^2$)

Furthermore, lithium-lanthanum-titanium oxide sintered material of the present invention is a sintered body of lithium-lanthanum-titanium oxide having a single phase ratio of 90% or more. It should be noted that the single phase ratio is defined as follows. Lithium-lanthanum-titanium oxide sintered material is pulverized in an alumina mortar to prepare a measuring sample, and the sample is measured using a powder X ray diffractometer (X ray source: CuKα ray). The single phase ratio is calculated by the formula below based on the heights of main peaks of lithium-lanthanum-titanium oxide and impurities from the diffraction pattern obtained.

$$\text{Single phase ratio } (\%) = I/(I+S) \times 100$$

I: height of the strongest peak of lithium-lanthanum-titanium oxide in $2\theta=0$ to $50°$
S: sum of heights of main peaks of all impurities It should be noted that $TiO_2$, $La_2O_3$, $Li_2Ti_3O_7$, $La_2Ti_2O_7$ or the like can be mentioned as the impurities.

Average particle diameter (size of each section of the sintered body, which is divided by particle interfaces) of lithium-lanthanum-titanium oxide sintered material of the present invention, is measured by the following method. After platinum is vapor deposited on the surface of the lithium-lanthanum-titanium oxide sintered material obtained, photographing is performed by a scanning type electron microscope at a magnification at which the number of particles is about 1200 in one field of view. Based on the image obtained, using an image analysis type particle size distribution measuring software, each crystal particle is surrounded by the minimum rectangle, and of the two axes of the rectangle being mutually perpendicular, the longer one is determined to be the particle diameter, the particle diameters of 1000 or more of the crystal particles is measured similarly, and the average value thereof is defined as an average particle diameter of the particles.

A method for production of lithium-lanthanum-titanium oxide sintered material of the present invention is explained as follows as one example. The method for production of lithium-lanthanum-titanium oxide sintered material of the present invention can be a method for production as long as composition and amounts of $SiO_2$ and $Al_2O_3$ contained are within the range of the present invention.

In lithium-lanthanum-titanium oxide sintered material of the present invention, for example, a lithium compound such as lithium hydroxide, lithium carbonate or the like is used as the lithium raw material, a titanium compound such as titanium oxide, metatitanic acid, orthotitanic acid or the like, or mixture thereof, is used as the titanium raw material, and lanthanum oxide is used as the lanthanum raw material. Raw materials for other elements (Sr, K, Fe, Ga, Ta) are prepared by using an oxide, hydroxide, chloride, carbonate or the like. After pulverizing a mixture of these powders under certain conditions, a lithium-lanthanum-titanium oxide sintered material can be obtained by baking the mixture.

Each raw material is of a weight depending on the required mole ratio. It should be noted that with respect to the lithium raw material, in view of vaporizing of lithium compound during provisional baking and final sintering, lithium raw material in an excess amount of 0 to 15 mass % of the lithium raw material is added. Each raw material weighed is placed in a ball mill, mixed and pulverized (primary pulverization), to obtain primary pulverized raw material. Then, pulverization is performed again with adding a mixed solvent of pure water and alcohol (ethanol for example) as a dispersing medium, and adding another dispersing medium such as a surfactant, if necessary. After performing pulverization for 20 to 50 minutes, the ball mill is allowed to rest for 10 to 20 hours, and then pulverization is performed again for 20 to 50 minutes. By allowing it to rest for 10 to 20 hours, part of the lithium compound and lanthanum compound, which are raw materials, is eluted so as to reduce particle diameter, thereby enabling shortening pulverizing time. Furthermore, by using a mixed solvent of pure water and alcohol, raw material disperses uniformly rather than being aggregated, and time for pulverization can be shortened compared to a case of pulverization with only water. Due to the reduction in time for pulverization, contamination by $Al_2O_3$ and $SiO_2$ components can be reduced. It should be noted that a urethane lining ball mill, a nylon ball mill, or a natural rubber lining ball mill can be used as the pulverizing device, and a zirconia medium or alumina medium can be used as the pulverizing medium. By using the above ball mill, contamination by $Al_2O_3$ and $SiO_2$ components can be reduced compared to a case in which an alumina lining ball mill (components of the lining material are $Al_2O_3$: 94%, $SiO_2$: 4%) is used.

Then, the primary pulverized raw material is dried so as to obtain the primary dried powder. A method for drying is not limited, in particular, and for example, a spray dryer drying machine, a fluidized layer drying machine, a rolling granulating drying machine, a freezing drying machine, or a hot air drying machine may be mentioned. Drying conditions under the spray dryer is 200 to 250° C. at an inlet of hot air, and 90 to 120° C. at exhaust of the air.

Then, the primary dried powder is baked provisionally to obtain provisional baked powder. Provisional baking conditions are 1000 to 1200° C. under an atmosphere of oxygen, air, or inert gas (nitrogen or other inert gas) for 1 to 12 hours.

The provisional baked powder obtained is put in ball mill to perform secondary pulverization so as to obtain a secondary baked raw material. Pulverization is performed with adding a mixed solvent of pure water and alcohol (ethanol for example) as a dispersing medium, and adding another dispersing medium such as a surfactant, if necessary. Time for pulverization is 1 to 6 hours. Urethane lining ball mill, nylon ball mill, or natural rubber lining ball mill can be used as the pulverizing device. By using the above ball mill, contamination by $Al_2O_3$ and $SiO_2$ components can be reduced.

Then, the secondary pulverized raw material is dried in the same manner as the primary pulverized raw material, so as to obtain the secondary dried powder. The method for drying is not limited, in particular, and for example, a spray dryer drying machine or a hot air drying machine can be mentioned.

The secondary dried powder obtained is processed in a desired shape by a forming method such as CIP forming, mold forming, casting forming, extrusion forming, and green sheet casing forming, so as to obtain a formed material. Forming conditions when employing the mold forming is forming pressure of 400 to 1500 kg/cm², for example.

The formed material obtained is sintered so as to obtain lithium-lanthanum-titanium oxide of the present invention. After performing primary sintering at 1000 to 1200° C. for 1 to 4 hours, secondary sintering is performed at 1200 to 1500° C. for 4 to 10 hours. By varying the secondary sintering conditions, particle diameters of crystal particles can be controlled. The sintering atmosphere of the primary sintering and the secondary sintering is oxygen, air, or inert gas (nitrogen or other inert gas). Furthermore, in the present invention, lithium-lanthanum-titanium oxide is produced by a solid phase method. Therefore, if compared to a case of a liquid phase method in which crystal particles are grown in a solvent and then the solvent is removed, a sintered material including large crystal particles having average particle diameter of 18 μm or more can be produced at low cost.

In the present invention, in order to improve lithium ion conductivity, it is necessary that the average particle diameter be 18 μm or more, and desirably 21 μm or more. Furthermore, the upper limit is 100 μm.

In the present invention, although the reasons for improving lithium ion conductivity are uncertain, they can be assumed to be as follows. Si compound and Al compound contained in lithium-lanthanum-titanium oxide sintered material are thought to deposit at the particle interface and is thought to inhibit lithium ion conductivity. The amount of $Al_2O_3$ contained is reduced to 0.35 mass % or less, and amount of $SiO_2$ contained is reduced to 0.1 mass % or less, so as to reduce Si compounds and Al compounds deposited at particle interfaces. In addition, the volume of particle interfaces of lithium-lanthanum-titanium oxide sintered material is reduced. As a result, lithium ion conductivity can be improved. By sintering at 1200° C. or more, average particle diameter of the lithium-lanthanum-titanium oxide sintered material is 18 μm or more, and the volume of the particle interface is reduced. Furthermore, by sintering at 1200° C. or more, the Si compounds and Al compounds that are deposited at the particle interfaces are expelled out of the interfaces. As a result, lithium-lanthanum-titanium oxide sintered material having a lithium ion conductivity of $3.0 \times 10^{-4}$ $Scm^{-1}$ or more is thought to be obtainable.

All-Solid Lithium Ion Battery

The all-solid lithium ion battery of the present invention includes a cathode active material layer containing a cathode active material, an anode active material layer containing an anode active material, and a solid electrolyte layer comprising of lithium-lanthanum-titanium oxide sintered material of the present invention arranged between the cathode active material layer and the anode active material layer.

Cathode Active Material Layer

The cathode active material layer comprises of a cathode active material such as $LiCoO_2$, $LiMnO_2$, $LiNiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$ for example, and if necessary, a conductive material and a binding material. As the conductive material, acetylene black, Ketchen black, carbon fiber or the like can be mentioned. As the binding material, fluorine-containing binder, such as polytetrafluoroethylene (PTFE) or the like, can be mentioned.

Anode Active Material Layer

The anode active material layer comprises of an anode active material such as a metal, carbon, ceramic or the like, a conductive material, and a binding material. For example, as a metallic active material, lithium and alloy containing lithium metal can be mentioned. As a carbon active material, for example, meso carbon micro beads (MCMB), highly orientated pyrolytic graphite (HOPG), hard carbon, soft carbon, and the like, can be mentioned. Furthermore, as a ceramic active material, $Li_4Ti_5O_{12}$ can be mentioned. The conductive material, the solid electrolyte material and the binding material similar to the cathode active material layer can be used.

Other Components

The all-solid lithium ion battery of the present invention can include a cathode collector that can collect electricity from the cathode active material layer and an anode collector that can collect electricity from the anode active material layer. The material of the cathode collector is not limited in particular, as long as it can withstand the environment in which it is to be used. For example, as the material of the cathode collector, stainless steel, aluminum, nickel, iron, titanium or the like, alloys containing at least one of these metals, and carbon, can be mentioned. As the material of the anode collector, stainless steel, copper, nickel, alloys containing at least one of these metals, and carbon, can be mentioned.

Air Battery

The air battery of the present invention includes an anode active material layer, a solid electrolyte comprising of lithium-lanthanum-titanium oxide sintered material of the present invention, and a cathode active material layer, and the electrolytic solution is arranged between the anode active material layer and the solid electrolyte and between the cathode active material layer and the solid electrolyte.

Cathode Active Material Layer

As the cathode active material layer, the formation is not limited in particular as long as it functions as a cathode of the air battery, and a known construction can be mentioned. For example, a complex oxide which is porous, conductive, and permeable to gas and does not contain carbon, for example, lanthanum-strontium-manganese type complex oxide, lanthanum-strontium-cobalt type complex oxide, lanthanum-strontium-copper type complex oxide, lanthanum-calcium-manganese type complex oxide, lanthanum-calcium-cobalt type complex oxide, lanthanum-calcium-copper type complex oxide, lanthanum-barium-manganese type complex oxide, lanthanum-barium-cobalt type complex oxide, lanthanum-barium-copper type complex oxide, and the like, can be mentioned.

Anode Active Material Layer

The anode active material layer contains anode active material that can emit lithium ions, or desirably, can contain and emit lithium ions. As the anode active material, metallic active material such as lithium, alloy containing lithium, and $Li_4Ti_5O_{12}$ and the like can be mentioned.

Electrolytic Solution Between Anode Active Material Layer and Solid Electrolyte

Electrolytic solution comprises of electrolyte and solvent. The electrolyte is not limited in particular as long as it forms lithium ions in the solvent. For example, $LiPF_6$, $LiClO_4$, $LiBF_4$, $LiAsF_6$, $LiAlCl_4$, $LiCF_3SO_3$, $LiSbF_6$ or the like can be mentioned. These electrolytes can be used alone or in combination. Furthermore, as the solvent, for example, propylene carbonate, tetrahydrofuran, dimethylsulfoxide, γ-butylolactone, 1,3-dioxolane, 4-methyl-1,3-dioxolane, 1,2-dimethoxyethane, 2-methyltetrahydrofuran, sulfolane, diethylcarbonate, dimethylformamide, acetonitrile, dimethylcarbonate, ethylenecarbonate or the like can be mentioned. These solvents can be used alone or in combination.

Electrolytic Solution Between Cathode Active Material Layer and Solid Electrolyte As the electrolytic solution between the cathode active material layer and the solid electrolyte, water type electrolyte solution or organic electrolyte solution, which is used in a typical air battery, can be used. For example, LiOH water solution may be mentioned.

Other Components

The air battery according to the present invention typically includes a cathode collector that collects electricity of the cathode active material layer and an anode collector that collects electricity of the anode active material layer. The material of the collector is not limited in particular as long as it can withstand the environment during use of the air battery. As the material of the cathode collector, for example, metal such as manganese, cobalt, nickel, ruthenium, rhodium, silver, iridium, platinum, gold, stainless steel, aluminum, iron, titanium or the like, alloy containing at least one of these metals, and carbon or the like can be mentioned. On the other hand, as the material of the anode collector, for example, metal such as platinum, gold, stainless steel, copper, nickel or the like, alloy containing at least one of these metals, carbon or the like can be mentioned.

The above-mentioned all-solid lithium ion battery and the air battery can be used in a device that travels, a stationary system device, or a backup power source device. As the device that travels, for example, a vehicle, forklift, construction machine, motorcycle, bicycle, robot, airplane, ship, train, artificial satellite or the like can be mentioned. As the stationary system device, for example, a water power generation system, fire power generation system, atomic powder generation system, solar light power generation system, wind power generation system, geothermal power generation system, tidal power (ocean current, wave power) generation system or the like can be mentioned. As the backup power source system device, for example, emergency power system device or the like for a construction (public facility, commercial facility, factory, hospital, residence or the like) can be mentioned.

EXAMPLES

Hereinafter, the present invention is further explained by way of Examples, which are merely exemplifications, and the present invention is not limited to these Examples.

1. Evaluating Method of Lithium-Lanthanum-Titanium Oxide Sintered Material Determining Method of x and a in Composition Formula A lithium-lanthanum-titanium oxide sintered material, $Na_2O_2$ and NaOH were put in a zirconium crucible, heated, and melted. This was allowed to stand to cool and was dissolved by adding water and HCl. The dissolved liquid part was collected. Ti was quantified by an aluminum reduction-ammonium iron sulfate (III) titration method and the other elements were quantified by ICP emission spectrometry, the value of x and a were determined in general formulas $(1-a)La_xLi_{2-3x}TiO_{3-a}SrTiO_3$, $(1-a)La_xLi_{2-3x}TiO_{3-a}La_{0.5}K_{0.5}TiO_3$, $La_xLi_{2-3x}Ti_{3-a}M_aO_{3-a}$, $Sr_{x-1.5a}La_aLi_{1.5-2x}Ti_{0.5}Ta_{0.5}O_3$ ($0.55 \leq x \leq 0.59$, $0 \leq a \leq 0.2$, M=at least one of Fe or Ga).

Quantification Method of $Al_2O_3$ and $SiO_2$

Tabular lithium-lanthanum-titanium oxide sintered material obtained was directly placed in a cell for analysis, and qualitative and quantitative analyses of surface of the sample were performed by a wavelength dispersing type fluorescent X ray device (trade name: LIX3000 produced by Rigaku Corporation), so as to calculate concentration of $Al_2O_3$ and $SiO_2$.

Measuring Method of Lithium Ion Conductivity

A surface of sample of tabular (15 mm×15 mm×2.5 mm) lithium-lanthanum-titanium oxide sintered material was ground by a diamond grinding stone of #150, and polished by a diamond grinding stone of #600 to finish. 1M lithium chloride water solution was absorbed in two sheets of filter paper cut in a size of 10 mm×10 mm, and the tabular lithium-lanthanum-titanium oxide sintered material was adhered between the two sheets. A Cole-Cole plot was measured by using an impedance analyzer (trade name: 4192A produced by Hewlett Packard Co.) at a measuring frequency 5 Hz to 13 MHz and a measuring temperature of 27° C., and resistance values inside of a particle and at a particle interface was read based on the data measured. Lithium ion conductivity was calculated by the following formula.

Lithium ion conductivity $(Scm^{-1})=1/(R_b+R_{gb})\times(L/S)$ $R_b$: resistance inside of particle (Ω)
$R_{gb}$: resistance at interface of particle (Ω)

L: thickness of tabular lithium-lanthanum-titanium oxide (cm)

S: area of electrode (cm²)

Measuring Method of Particle Diameter

After vapor depositing platinum by an ion sputterer (produced by Hitachi Science Systems) onto the surface of lithium-lanthanum-titanium oxide sintered material obtained, photographing was performed by a scanning electron microscope (trade name S-4700, produced by Hitachi High Technologies) so that the number of particles was about 1200 in one field of view.

Figure 3:
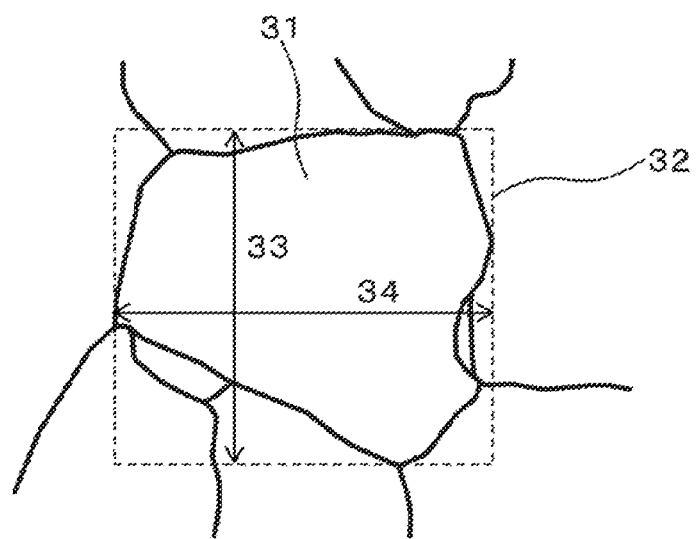
FIG. 3 schematically illustrates measuring particle diameter using image analysis type particle size distribution measuring software.

As illustrated schematically in FIG. 3, using image analysis type particle size distribution measuring software (trade name: Mac-View Ver. 4, produced by Mountech Co. Ltd.), each crystal particle 31 was surrounded by the minimal rectangle 32, and of the two axes (33, 34) of the rectangle being mutually perpendicular, the longer one 34 was determined to be the particle diameter, the particle diameter of 1000 or more crystal particles was measured similarly, and the average value thereof was defined as the average particle of diameter of the particles.

Measuring Method of Single Phase Ratio

The lithium-lanthanum-titanium oxide sintered material obtained was pulverized in an alumina mortar to prepare a measuring sample, and the sample was measured using an X ray diffractometer (X ray source: CuKα ray, trade name: X' Part-ProMPD, produced by PANalytical B. V.). Single phase ratio was calculated by the formula below based on heights of the main peaks of lithium-lanthanum-titanium oxide and impurities from the diffraction pattern obtained.

Single phase ratio (%)=$I/(I+S)\times 100$

I: height of the strongest peak of lithium-lanthanum-titanium oxide in 2θ=0 to 50°

S: sum of heights of main peaks of all the impurities

Example 1

1. Raw Material

As raw materials, lithium carbonate (produced by Sociedad Quimica y Minera de Chile S. A., purity: 99.2% or more), lanthanum oxide (produced by Yixing Xinwei Leeshing Rare Earth Co., Ltd, purity: 99.99% or more), and titanium oxide (produced by TOHO TITANIUM CO., LTD., purity: 99.99% or more) were prepared. The weight of each raw material is shown in Table 1. The amount of lithium carbonate added was 7.5 mass % in excess.

2. Primary Pulverization

The raw materials weighed, 200 kg of alumina media (diameter: 3 mm), 35 L of ion exchanged water and 35 L of ethanol were placed in a urethane lining ball mill (capacity 200 L), and the raw materials were pulverized and mixed for 30 minutes. They were allowed to rest for 15 hours in the ball mill, and then, they were pulverized again for 30 minutes to obtain a primary pulverized powder.

3. Primary Drying

The primary pulverized powder was dried by a spray dryer to obtain the primary dried powder. The conditions of the spray drying were as follows.

Amount of raw material supplied: 10 to 30 L/h

Temperature at hot air inlet: 200 to 250° C.

Air exhaust temperature: 90 to 120° C.

4. Provisional Baking

The primary dried powder was put in a sagger made of cordierite mullite material, provisionally baked in an electric furnace to obtain the provisional baked powder. The conditions of baking were provisional baking temperature of 1150° C., and provisional baking time of 2 hours under an atmosphere.

5. Secondary Pulverization 70 kg of the provisional baked powder, 200 kg of zirconia media (diameter 3 mm), 60 L of ion exchanged water and 700 g of dispersing agent (ammonium polyacrylate salt) were placed in a urethane lining ball mill (capacity 200 L), and the powder was pulverized for 6 hours. After that, 4.5 kg of acrylic resin type binder was placed therein, and they are mixed for 15 minutes so as to obtain the secondary pulverized powder.

6. Secondary Drying

The secondary pulverized powder was dried by spray dryer to obtain the secondary dried powder. The conditions of the spray dryer were as follows.

Amount of raw material supplied: 10 to 30 L/h

Temperature at hot air inlet: 200 to 250° C.

Air exhaust temperature: 90 to 120° C.

7. Molding 15 g of the secondary dried powder was formed into a tabular shape of 40 mm×40 mm×thickness 3 mm by a mold forming (forming pressure 1000 kg/cm²), so as to obtained a molded body.

8. Sintering

Primary sintering of the molded body was performed in an electric furnace at 1100° C. for 2 hours under an atmosphere, and then, secondary sintering was performed at 1460° C. for 6 hours, so as to obtain a lithium-lanthanum-titanium oxide sintered material. Single phase ratio, $Al_2O_3$ concentration, $SiO_2$ concentration, lithium ion conductivity, and average particle diameter of the lithium-lanthanum-titanium oxide sintered body obtained are shown in Table 2.

Example 2

The lithium-lanthanum-titanium oxide sintered material was produced in a manner similar to that in Example 1, except that zirconia media (diameter 3 mm) was used instead of the alumina media (diameter 3 mm) in "2. Primary pulverization" of Example 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Example 3

The lithium-lanthanum-titanium oxide sintered material was produced in a manner similar to that in Example 1, except that weight of each raw material in Example 1 was changed as shown in Table 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Example 4

The lithium-lanthanum-titanium oxide sintered material was produced in a manner similar to that in Example 1, except that the weight of each raw material in Example 1 was changed as shown in Table 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Example 5

The lithium-lanthanum-titanium oxide sintered material was produced in a manner similar to that in Example 1, except that the sintering temperature in "8. Sintering" of Example 1 was changed from 1460° C. to 1430° C. Single phase ratio, $Al_2O_3$ concentration, $SiO_2$ concentration, lithium ion conductivity, and average particle diameter of the lithium-lanthanum-titanium oxide sintered body obtained are shown in Table 2.

Example 6

The lithium-lanthanum-titanium oxide sintered material was produced in a manner similar to that in Example 1, except that the weight of each raw material in Example 1 was changed as shown in Table 1, and that 3.666 kg of $SrCO_3$ was added. Single phase ratio, $Al_2O_3$ concentration, $SiO_2$ concentration, and lithium ion conductivity of the lithium-lanthanum-titanium oxide sintered body obtained are shown in Table 2.

Example 7

The lithium-lanthanum-titanium oxide sintered material was produced in a manner similar to that in Example 1, except that the weight of each raw material in Example 1 was changed as shown in Table 1, and that 11.00 kg of $SrCO_3$ was added. Single phase ratio, $Al_2O_3$ concentration, $SiO_2$ concentration, and lithium ion conductivity of the lithium-lanthanum-titanium oxide sintered body obtained are shown in Table 2.

Example 8

The lithium-lanthanum-titanium oxide sintered material was produced in a manner similar to that in Example 1, except that the weight of each raw material in Example 1 was changed as shown in Table 1, and that 1.884 kg of $Fe_2O_3$ was added. Single phase ratio, $Al_2O_3$ concentration, $SiO_2$ concentration, and lithium ion conductivity of the lithium-lanthanum-titanium oxide sintered body obtained are shown in Table 2.

Example 9

The lithium-lanthanum-titanium oxide sintered material was produced in a manner similar to that in Example 1, except that the weight of each raw material in Example 1 was changed as shown in Table 1, and that 5.651 kg of $Fe_2O_3$ was added. Single phase ratio, $Al_2O_3$ concentration, $SiO_2$ concentration, and lithium ion conductivity of the lithium-lanthanum-titanium oxide sintered body obtained are shown in Table 2.

Example 10

The lithium-lanthanum-titanium oxide sintered material was produced in a manner similar to that in Example 1, except that the weight of each raw material in Example 1 was changed as shown in Table 1, and that 36.29 kg of $SrCO_3$ and 54.86 kg of $Ta_2O_5$ were added. Single phase ratio, $Al_2O_3$ concentration, $SiO_2$ concentration, and lithium ion conductivity of the lithium-lanthanum-titanium oxide sintered body obtained are shown in Table 2.

Example 11

The lithium-lanthanum-titanium oxide sintered material was produced in a manner similar to that in Example 1, except that weight of each raw material in Example 1 was changed as shown in Table 1, and that 25.30 kg of $SrCO_3$ and 54.86 kg of $Ta_2O_5$ were added. Single phase ratio, $Al_2O_3$ concentration, $SiO_2$ concentration, and lithium ion conductivity of the lithium-lanthanum-titanium oxide sintered body obtained are shown in Table 2.

Example 12

The lithium-lanthanum-titanium oxide sintered material was produced in a manner similar to that in Example 1, except that "7. Molding" in Example 1 was changed to "110 g of the secondary dried powder was formed in a cylindrical shape having a bottom outer diameter 23 mm, inner diameter 17 mm, length 180 mm and bottom thickness 5 mm, by CIP forming (forming pressure 1000 kg/cm$^2$), so as to obtain the molded body".

Using the produced lithium-lanthanum-titanium oxide sintered material as a solid electrolyte, the air battery 1 shown in FIG. 1 was produced. Practically, anode active material layer 3 was arranged on an inner surface side of an anode active material supporting body 2a, primary electrolytic solution 4 was arranged between the anode active material layer 3 and solid electrolyte 5, secondary electrolytic solution 6 was arranged between the cathode active material layer 7 and the solid electrolyte 5, and lid 2b was arranged on the anode active material supporting body 2a. The anode active material supporting body 2a, the solid electrolyte 5, and the cathode active material layer 7 used in the air battery 1 are cylindrical having a bottom. After preparing the air battery 1, oxygen is caused to flow inside of the cathode active material layer 7, so as to measure charging and discharging.

Materials of the anode active material supporting body 2a, the anode active material layer 3, the cathode active material layer 7, the primary electrolytic solution 4 between the anode active material layer 3 and the solid electrolyte 5, the secondary electrolytic solution 6 between the cathode active material layer 7 and the solid electrolyte 5, and the lid 2b are as follows.

Figure 2:
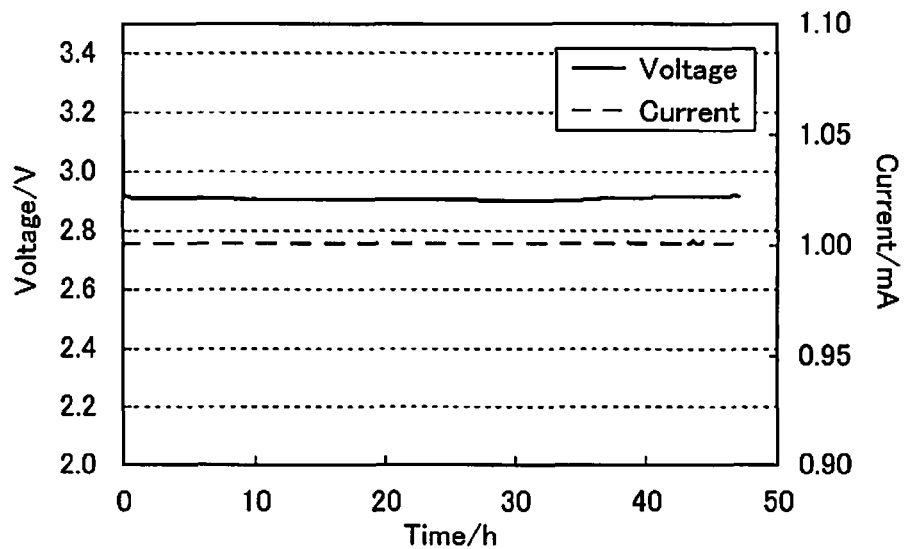
FIG. 2 is a result of measuring discharging of an air batter in an Example of the present invention.

Anode active material supporting body 2a: SUS316L
Anode active material layer 3: lithium metal
Cathode active material layer 7: porous carbon
Primary electrolyte solution 4: 1.0 M LiClO$_4$ solution (solvent is ethylene carbonate and dimethylcarbonate)
Secondary electrolyte solution 6: 0.5 M LiOH water solution
Lid 2b: SUS316L While flowing oxygen (99.5% or more) through the cathode active material layer 7 at 100 mL/imin, discharging process was measured at a constant current (1 mA) and temperature 27° C. The results are shown in FIG. 2. It is obvious from the figure that discharging can be performed stably for 47 hours at a discharging voltage of about 2.9 V, and the battery has high discharging characteristics.

Comparative Example 1

Pulverization was performed continuously for 20 hours instead of allowing it to rest for 15 hours in the ball mill and again pulverizing for 30 minutes after 30 minutes of pulverization/mixing condition of "2. Primary pulverizing" in Example 1. Alumina media (diameter 3 mm) was used and pulverizing was performed for 10 hours instead of using zirconia media (diameter 3 mm) and pulverizing for 6 hours in "5. Secondary pulverization". Except for these changes, lithium-lanthanum-titanium oxide sintered material was produced in a manner similar to that in Example 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 2

The lithium-lanthanum-titanium oxide sintered material was produced in a manner similar to that in Example 1, except that weight of each raw material in Example 1 was changed as shown in Table 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 3

The lithium-lanthanum-titanium oxide sintered material was produced in a manner similar to that in Example 1, except that the weight of each raw material in Example 1 was changed as shown in Table 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 4

The lithium-lanthanum-titanium oxide sintered material was produced in a manner similar to that in Example 1, except that 0.8527 kg of $Al_2O_3$ was added during pulverization of "5. Secondary pulverization". Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 5

The lithium-lanthanum-titanium oxide sintered material was produced in a manner similar to that in Example 1, except that 0.8527 kg of $SiO_2$ was added during pulverization of "5. Secondary pulverization". Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 6

The lithium-lanthanum-titanium oxide sintered material was produced in a manner similar to that in Example 1, except that the sintering temperature was changed from 1460° C. to 1410° C. during "8. Sintering" in Example 1. Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 7

"2. Primary pulverizing" in Example 1 was changed to "the weighed raw materials and 0.035 L of ethanol were placed in an agate mortar and the materials were pulverized and mixed for 30 minutes." Furthermore, "3. Primary drying" was changed to "the primary pulverized powder was placed in a vat and dried at 120° C.". The provisional baking temperature was changed from 1150° C. to 800° C. and the provisional baking time was changed from 2 hours to 4 hours in "4. Provisional baking". "5. Secondary pulverizing" was changed to "0.07 kg of the provisional baked powder was placed in an agate mortar and pulverized for 30 minutes". "6. Secondary drying" was changed to "the primary pulverized powder was put in a vat and dried at 120° C.". "8. Sintering" was changed to "the secondary sintering of the molded body was performed in an electric furnace at 1150° C. for 6 hours to obtain the lithium-lanthanum-titanium oxide sintered material". Single phase ratio, $Al_2O_3$ concentration, $SiO_2$ concentration, lithium ion conductivity, and average particle diameter of the lithium-lanthanum-titanium oxide sintered body obtained are shown in Table 2.

Comparative Example 8

Pulverization was performed continuously for 20 hours instead of allowing it to rest for 15 hours in the ball mill and again pulverizing for 30 minutes after 30 minutes of pulverization/mixing condition of "2. Primary pulverizing" in Example 1. Alumina media (diameter 3 mm) was used and pulverizing was performed for 10 hours instead of using zirconia media (diameter 3 mm) and pulverizing for 6 hours in "5. Secondary pulverization". Except for these changes, the lithium-lanthanum-titanium oxide sintered material was produced in a manner similar to that in Example 6. Single phase ratio, $Al_2O_3$ concentration, $SiO_2$ concentration, and lithium ion conductivity of the lithium-lanthanum-titanium oxide sintered body obtained are shown in Table 2.

Comparative Example 9

Pulverization was performed continuously for 20 hours instead of allowing it to rest for 15 hours in the ball mill and again pulverizing for 30 minutes after 30 minutes of pulverization/mixing condition of "2. Primary pulverizing" in Example 1. Alumina media (diameter 3 mm) was used and pulverizing was performed for 10 hours instead of using zirconia media (diameter 3 mm) and pulverizing for 6 hours in "5. Secondary pulverization". Except for these changes, the lithium-lanthanum-titanium oxide sintered material was produced in a manner similar to that in Example 8. Single phase ratio, $Al_2O_3$ concentration, $SiO_2$ concentration, and lithium ion conductivity of the lithium-lanthanum-titanium oxide sintered body obtained are shown in Table 2.

Comparative Example 10

Pulverization was performed continuously for 20 hours instead of allowing it to rest for 15 hours in the ball mill and again pulverizing for 30 minutes after 30 minutes of pulverization/mixing condition of "2. Primary pulverizing" in Example 1. Alumina media (diameter 3 mm) was used and pulverizing was performed for 10 hours instead of using zirconia media (diameter 3 mm) and pulverizing for 6 hours in "5. Secondary pulverization". Except for these changes, the lithium-lanthanum-titanium oxide sintered material was produced in a manner similar to that in Example 10. Single phase ratio, $Al_2O_3$ concentration, $SiO_2$ concentration, and lithium ion conductivity of the lithium-lanthanum-titanium oxide sintered body obtained are shown in Table 2.

TABLE 1

|  | Composition | $Li_2CO_3$ (kg) | $TiO_2$ (kg) | $La_2O_3$ (kg) | $Al_2O_3$ (kg) | $SiO_2$ (kg) |
|---|---|---|---|---|---|---|
| Example 1 | $La_{0.57}Li_{0.29}TiO_3$ | 5.321 | 36.90 | 42.90 | 0 | 0 |
| Example 2 |  | 5.321 | 36.90 | 42.90 | 0 | 0 |
| Example 3 | $La_{0.55}Li_{0.35}TiO_3$ | 6.422 | 36.90 | 41.40 | 0 | 0 |
| Example 4 | $La_{0.59}Li_{0.23}TiO_3$ | 4.220 | 36.90 | 44.41 | 0 | 0 |
| Example 5 | $La_{0.57}Li_{0.29}TiO_3$ | 5.321 | 36.90 | 42.90 | 0 | 0 |
| Example 6 | $0.95La_{0.57}Li_{0.29}TiO_3$-$0.05SrTiO_3$ | 5.055 | 36.90 | 40.76 | 0 | 0 |
| Example 7 | $0.85La_{0.57}Li_{0.29}TiO_3$-$0.15SrTiO_3$ | 4.523 | 36.90 | 36.47 | 0 | 0 |
| Example 8 | $La_{0.57}Li_{0.29}Ti_{0.95}Fe_{0.05}O_{2.95}$ | 5.321 | 35.06 | 42.90 | 0 | 0 |
| Example 9 | $La_{0.57}Li_{0.29}Ti_{0.85}Fe_{0.15}O_{2.85}$ | 5.321 | 31.37 | 42.90 | 0 | 0 |
| Example 10 | $Sr_{0.495}La_{0.05}Li_{0.36}Ti_{0.5}Ta_{0.5}O_3$ | 6.606 | 18.45 | 3.76 | 0 | 0 |
| Example 11 | $Sr_{0.345}La_{0.15}Li_{0.36}Ti_{0.5}Ta_{0.5}O_3$ | 6.606 | 18.45 | 11.29 | 0 | 0 |
| Comparative Example 1 | $La_{0.57}Li_{0.29}TiO_3$ | 5.445 | 36.90 | 42.90 | 0 | 0 |
| Comparative Example 2 | $La_{0.54}Li_{0.38}TiO_3$ | 7.134 | 36.90 | 40.64 | 0 | 0 |
| Comparative Example 3 | $La_{0.60}Li_{0.20}TiO_3$ | 3.755 | 36.90 | 45.16 | 0 | 0 |
| Comparative Example 4 | $La_{0.57}Li_{0.29}TiO_3$ | 5.445 | 36.90 | 42.90 | 0.8527 | 0 |
| Comparative Example 5 |  | 5.445 | 36.90 | 42.90 | 0 | 0.8527 |
| Comparative Example 6 |  | 5.445 | 36.90 | 42.90 | 0 | 0 |
| Comparative Example 7 |  | 0.005445 | 0.03690 | 0.04290 | 0 | 0 |
| Comparative Example 8 | $0.95La_{0.57}Li_{0.29}TiO_3$-$0.05SrTiO_3$ | 5.055 | 36.90 | 40.76 | 0 | 0 |
| Comparative Example 9 | $La_{0.57}Li_{0.29}Ti_{0.95}Fe_{0.05}O_{2.95}$ | 5.321 | 35.06 | 42.90 | 0 | 0 |
| Comparative Example 10 | $Sr_{0.495}La_{0.05}Li_{0.36}Ti_{0.5}Ta_{0.5}O_3$ | 6.606 | 18.45 | 3.76 | 0 | 0 |

TABLE 2

|  | Composition | Single phase ratio (%) | $Al_2O_3$ Concentration (mass %) | $SiO_2$ Concentration (mass %) | Conductivity ($Scm^{-1}$) | Average particle diameter (μm) |
|---|---|---|---|---|---|---|
| Example 1 | $La_{0.57}Li_{0.29}TiO_3$ | 96 | 0.295 | 0.044 | $5.7 \times 10^{-4}$ | 26 |
| Example 2 |  | 97 | 0.031 | 0.021 | $6.0 \times 10^{-4}$ | 25 |
| Example 3 | $La_{0.55}Li_{0.35}TiO_3$ | 95 | 0.241 | 0.042 | $3.3 \times 10^{-4}$ | 23 |
| Example 4 | $La_{0.59}Li_{0.23}TiO_3$ | 92 | 0.202 | 0.040 | $3.0 \times 10^{-4}$ | 28 |
| Example 5 | $La_{0.57}Li_{0.29}TiO_3$ | 97 | 0.232 | 0.045 | $4.1 \times 10^{-4}$ | 18 |
| Example 6 | $0.95La_{0.57}Li_{0.29}TiO_3$—$0.05SrTiO_3$ | 95 | 0.256 | 0.045 | $4.4 \times 10^{-4}$ | 25 |
| Example 7 | $0.85La_{0.57}Li_{0.29}TiO_3$—$0.15SrTiO_3$ | 92 | 0.285 | 0.040 | $3.6 \times 10^{-4}$ | 23 |
| Example 8 | $La_{0.57}Li_{0.29}Ti_{0.95}Fe_{0.05}O_{2.95}$ | 95 | 0.290 | 0.044 | $4.2 \times 10^{-4}$ | 24 |
| Example 9 | $La_{0.57}Li_{0.29}Ti_{0.95}Fe_{0.15}O_{2.95}$ | 92 | 0.298 | 0.046 | $3.4 \times 10^{-4}$ | 27 |
| Example 10 | $Sr_{0.495}La_{0.05}Li_{0.36}Ti_{0.5}Ta_{0.5}O_3$ | 95 | 0.260 | 0.042 | $4.1 \times 10^{-4}$ | 23 |
| Example 11 | $Sr_{0.345}La_{0.15}Li_{0.36}Ti_{0.5}Ta_{0.5}O_3$ | 93 | 0.295 | 0.041 | $3.2 \times 10^{-4}$ | 24 |
| Comparative Example 1 | $La_{0.57}Li_{0.29}TiO_3$ | 97 | 1.610 | 0.116 | $2.3 \times 10^{-4}$ | 26 |
| Comparative Example 2 | $La_{0.54}Li_{0.35}TiO_3$ | 96 | 0.275 | 0.039 | $1.0 \times 10^{-4}$ | 27 |
| Comparative Example 3 | $La_{0.50}Li_{0.30}TiO_3$ | 90 | 0.257 | 0.063 | $1.2 \times 10^{-4}$ | 30 |
| Comparative Example 4 | $La_{0.57}Li_{0.29}TiO_3$ | 97 | 1.450 | 0.054 | $2.1 \times 10^{-4}$ | 32 |
| Comparative Example 5 |  | 97 | 0.250 | 1.780 | $1.8 \times 10^{-4}$ | 25 |
| Comparative Example 6 |  | 97 | 0.257 | 0.045 | $2.8 \times 10^{-4}$ | 16 |
| Comparative Example 7 |  | 97 | 0.223 | 0.121 | $9.0 \times 10^{-5}$ | 9 |
| Comparative Example 8 | $0.95La_{0.57}Li_{0.29}TiO_3$—$0.05SrTiO_3$ | 91 | 1.710 | 0.133 | $1.0 \times 10^{-4}$ | 27 |
| Comparative Example 9 | $La_{0.57}Li_{0.29}Ti_{0.95}Fe_{0.05}O_{2.95}$ | 91 | 1.680 | 0.116 | $0.8 \times 10^{-4}$ | 26 |
| Comparative Example 10 | $Sr_{0.495}La_{0.05}Li_{0.36}Ti_{0.5}Ta_{0.5}O_3$ | 90 | 1.620 | 0.120 | $0.5 \times 10^{-4}$ | 27 |

In each Comparative Example in which at least one of $Al_2O_3$ concentration, $SiO_2$ concentration and average particle diameter is out of the scope of the present invention, lithium ion conductivity is less than $3.0 \times 10^{-4}$ $Scm^{-1}$. On the other hand, in each Example in which all of the values are within the range of the present invention, lithium ion conductivity is $3.0 \times 10^{-4}$ $Scm^{-1}$ or more. In particular, the conductivity was especially good in Examples 1, 2, 5, 8 and 10.

The present invention is promising since the lithium-lanthanum-titanium oxide sintered material can be provided, which can be used as a solid electrolyte for a lithium primary battery or a lithium secondary battery, for example, as a solid electrolyte for an all-solid lithium ion battery or a lithium air battery.

EXPLANATION OF REFERENCE NUMERALS

1: Air battery, 2a: Anode active material supporting body, 2b: Lid, 3: Anode active material layer, 4: Primary electrolytic solution, 5: Solid electrolyte, 6: Secondary electrolytic solution, 7: Cathode active material layer

The invention claimed is:

1. A sintered material comprising:
a lithium lanthanum titanium oxide described by the general formula $La_{0.57}Li_{0.29}TiO_3$;
a nonzero amount of $Al_2O_3$;
a nonzero amount of $SiO_2$; and
having an average particle diameter of 18 µm or more,
wherein the nonzero amount of $Al_2O_3$ is 0.35 mass % or less,
wherein the nonzero amount of $SiO_2$ is 0.1 mass % or less, and
wherein a tabular sample of the sintered material having a thickness (L) adhered between two sheets of filter paper and sandwiched between two electrodes provides a lithium ion conductivity calculated by the formula $(Scm^{-1})=1/(R_b+R_{gb})\times(L/S)$ between $3.0\times10^{-4}$ $Scm^{-1}$ and $6.0\times10^{-4}$, in condition in which an impedance analyzer is used,
wherein each sheet of filter paper contains a 1M lithium chloride water solution
wherein the measuring frequency is 5 to 13 MHz,
wherein the measuring temperature is 27° C.,
wherein $R_b$ is resistance inside of particle (Ω),
wherein $R_{gb}$ is resistance at interface of particle (Ω),
wherein L is thickness of the tabular sample of the sintered material (cm), and
wherein S is a surface area of one of the two electrodes ($cm^2$).

2. A solid electrolyte comprising the sintered material according to claim 1.

3. A lithium air battery comprising the solid electrolyte according to claim 2.

4. The lithium air battery according to claim 3 comprising an anode active material layer, solid electrolyte and a cathode active material layer, wherein electrolytic solution is contained between the anode active material layer and the solid electrolyte, and between the cathode active material layer and the solid electrolyte.

5. An all-solid lithium ion battery comprising the solid electrolyte according to claim 2.

* * * * *